US011244204B2

(12) United States Patent
Wang et al.

(10) Patent No.: US 11,244,204 B2
(45) Date of Patent: Feb. 8, 2022

(54) DETERMINING VIDEO CUTS IN VIDEO CLIPS

(71) Applicant: Adobe Inc., San Jose, CA (US)

(72) Inventors: Oliver Wang, Seattle, WA (US); Nico Alexander Becherer, Hamburg (DE); Markus Woodson, San Mateo, CA (US); Federico Perazzi, San Francisco, CA (US); Nikhil Kalra, New York, NY (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/879,362

(22) Filed: May 20, 2020

(65) Prior Publication Data

US 2021/0365742 A1    Nov. 25, 2021

(51) Int. Cl.
*G06K 9/62* (2006.01)
*G06K 9/00* (2006.01)
*G11B 27/06* (2006.01)

(52) U.S. Cl.
CPC ....... *G06K 9/6265* (2013.01); *G06K 9/00744* (2013.01); *G06K 9/00765* (2013.01); *G06K 9/6257* (2013.01); *G11B 27/06* (2013.01)

(58) Field of Classification Search
CPC ............. G06K 9/6265; G06K 9/00744; G06K 9/00765; G06K 9/6257; G11B 27/06
USPC ....................................................... 386/278
See application file for complete search history.

(56) References Cited

U.S. PATENT DOCUMENTS

| | | | |
|---|---|---|---|
| 2003/0234803 A1* | 12/2003 | Toyama | G11B 27/034 715/716 |
| 2004/0125124 A1* | 7/2004 | Kim | G06F 16/71 715/716 |
| 2007/0025614 A1* | 2/2007 | Qian | H04N 5/147 382/171 |
| 2016/0048723 A1* | 2/2016 | Jeong | G06K 9/4642 382/197 |
| 2016/0292510 A1* | 10/2016 | Han | G11B 27/06 |

OTHER PUBLICATIONS

Hassanien,"Large-scale, Fast and Accurate Shot Boundary Detection through Convolutional Neural Networks", May 2017, 8 pages.
Xu,"Shot Boundary Detection Using Convolutional Neural Networks", Nov. 2016, 4 pages.

* cited by examiner

*Primary Examiner* — Thai Q Tran
*Assistant Examiner* — Nienru Yang
(74) *Attorney, Agent, or Firm* — FIG. 1 Patents

(57) ABSTRACT

In implementations of determining video cuts in video clips, a video cut detection system can receive a video clip that includes a sequence of digital video frames that depict one or more scenes. The video cut detection system can determine scene characteristics for the digital video frames. The video cut detection system can determine, from the scene characteristics, a probability of a video cut between two adjacent digital video frames having a boundary between the two adjacent digital video frames that is centered in the sequence of digital video frames. The video cut detection system can then compare the probability of the video cut to a cut threshold to determine whether the video cut exists between the two adjacent digital video frames.

20 Claims, 7 Drawing Sheets

500

Move a sliding time window across a timeline of a video clip to select a sequence of digital video frames of the video clip that are contained in the sliding time window
502

Determine feature vectors for the digital video frames that represent features of one or more scenes depicted in the digital video frames
504

Determine, from the feature vectors, a probability of a video cut between two adjacent digital video frames having a boundary between the two adjacent digital video frames that is centered in the sequence of digital video frames
506

Compare the probability of the video cut to a cut threshold to determine whether the video cut exists between the two adjacent digital video frames
508

FIG. 5

DETERMINING VIDEO CUTS IN VIDEO CLIPS

BACKGROUND

Identifying video cuts between video frames of a video clip is a common task in video editing, since the locations of video cuts in a video clip are often required to properly edit the video clip, such as when synchronizing audio and video tracks of the video clip. A video cut can include a hard cut between two adjacent video frames, or a cut that spans multiple video frames, such as a fade or a wipe. Conventional video cut detection systems often determine color histograms from video frames and threshold the difference between the color histograms to detect a hard video cut. However, the proper value of the threshold applied to the color histograms can be highly dependent on the video content of the video frames, so that a threshold value can work for some, but not all, video clips. For instance, a threshold value for a video interview of a person may not be suitable for a video with fast camera motion. As a result, the conventional video cut detection systems often fail to detect a video cut, or produce false positives.

Moreover, because of the dependence of the threshold value on the video content, the conventional video cut detection systems usually require user interaction to set the threshold value, making the conventional video cut detection systems inefficient to use, and inappropriate for workflows that require full automation without user interaction. Furthermore, the conventional video cut detection systems that rely on differences in color histograms are usually limited to hard cuts between video frames, and are not suitable to multi-frame video cuts, such as a fade or a wipe.

Some conventional video cut detection systems use machine learning to detect a video cut in a video clip, and these systems can be used for both hard video cuts and multi-frame video cuts. However, these conventional video cut detection systems are limited to detecting the presence of a video cut within a time window of video frames, and do not determine the exact location of the video cut relative to the video frames within the time window. Hence, these conventional video cut detection systems are not suitable to many editing workflows in which the exact location of a video cut, e.g., between frame N and N+1, is required.

Accordingly, conventional video cut detection systems are not suitable to many video editing workflows, because they can be inaccurate (e.g., by failing to detect a video cut or falsely detecting a video cut), and imprecise (e.g., by not identifying the exact location of a video cut). Moreover, conventional video cut detection systems can be inefficient, since they require user interaction to manually adjust thresholds and therefore cannot be used in automated workflows.

SUMMARY

Techniques and systems are described for determining video cuts in video clips. A video cut detection system is implemented to receive a video clip that includes a sequence of digital video frames that depict one or more scenes. The video cut detection system can determine scene characteristics for the digital video frames, such as by generating feature vectors with a neural network for the digital video frames, the feature vectors representing features of the one or more scenes depicted in the digital video frames. The video cut detection system can determine, from the scene characteristics, a probability of a video cut between two adjacent digital video frames having a boundary between the two adjacent digital video frames that is centered in the sequence of digital video frames. The video cut detection system can then compare the probability of the video cut to a cut threshold to determine whether the video cut exists between the two adjacent digital video frames. To process the entire video clip, the video cut detection system can move a sliding time window across a timeline of the video clip to determine different sequences of digital video frames that are contained in the sliding time window, and for each sequence of digital video frames within the sliding time window, the video cut detection system can determine scene characteristics and a cut probability of a video cut. The video cut detection system can then mark the timeline of the video clip to indicate boundaries between digital video frames where a video cut exists.

The video cut detection system can generate training sequences of digital video frames to train the neural network that generates the feature vectors and the cut probability of a video cut. The video cut detection system can generate training sequences that do not include a video cut and label these training sequences with a false cut label. The video cut detection system can also generate training sequences labeled with a true cut label that have a video cut centered in the training sequence. The video cut detection system can also generate training sequences labeled with the false cut label that have the video cut that is off-center in the training sequences. Using the training sequences, the video cut detection system can evaluate a loss function based on the probability of the video cut and at least one of the false cut label or the true cut label, and update at least one coefficient of the neural network based on the loss function. In one example, the video cut detection system is implemented on a server that trains the neural network to determine video cuts in video clips, and the server provides the pre-trained neural network to a client computing device for use with user-provided video clips.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 5 illustrates a flow diagram depicting an example procedure in accordance with one or more aspects of the disclosure.

DETAILED DESCRIPTION

Overview

Figure 1:
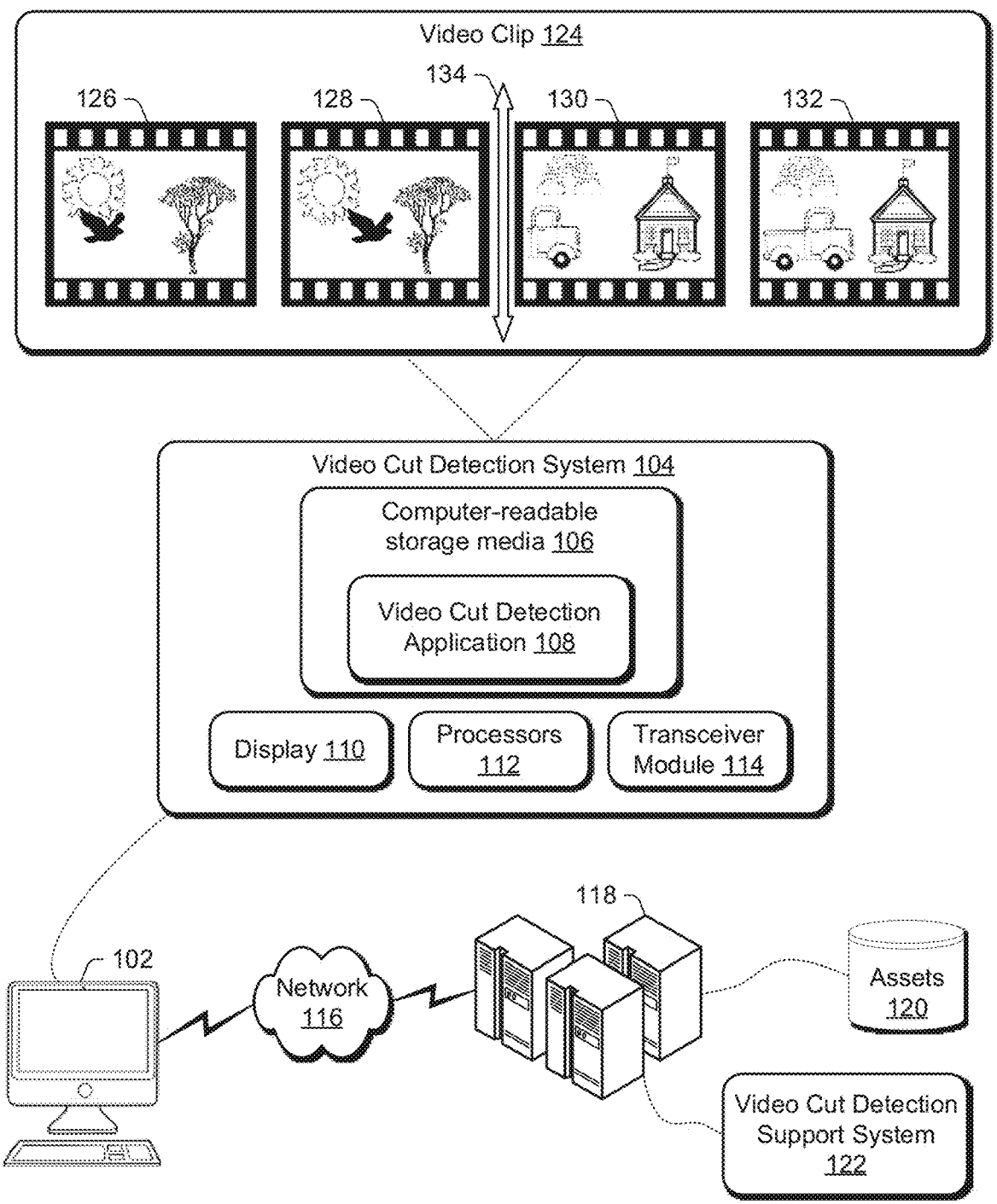
FIG. 1 illustrates a digital medium environment in an example implementation that is operable to employ techniques described herein.

Conventional video cut detection systems are not suitable to many video editing workflows, because they are often inaccurate, such as by failing to detect a video cut or falsely detecting a video cut where there is not a video cut. Moreover, conventional video cut detection systems are often inefficient, requiring user interaction to adjust threshold values used by the conventional video cut detection systems to determine differences in color histograms between digital video frames. These conventional video cut detection systems are also often limited to hard cuts between digital video frames, and are unable to detect multi-frame video cuts, such as fades and wipes. Furthermore, conventional video cut detection systems often fail to explicitly identify the exact location of a video cut in a video clip, and instead can detect that a video clip exists within a time duration that spans many digital video frames without determining the location of the video cut within the time duration.

Accordingly, this disclosure describes systems, devices, and techniques for determining video cuts in video clips. A video cut detection system is implemented to receive a video clip that includes a sequence of digital video frames that depict one or more scenes. The video cut detection system can determine scene characteristics for the digital video frames, such as by generating feature vectors with a neural network for the digital video frames. The feature vectors can represent features of the one or more scenes depicted in the digital video frames. The video cut detection system can determine, from the scene characteristics, a probability of a video cut between two adjacent digital video frames that have a boundary between the two adjacent digital video frames that is centered in the sequence of digital video frames. The video cut detection system can then compare the probability of the video cut to a cut threshold to determine whether the video cut exists between the two adjacent digital video frames. For instance, when the probability of the video cut is greater than the cut threshold, the video cut detection system can determine that a video cut exists at the boundary between the two adjacent digital video frames. In one example, the cut threshold is set to a value of 0.999.

To process the entire video clip, the video cut detection system can move a sliding time window across a timeline of the video clip to determine different sequences of digital video frames that are contained in the sliding time window. For each sequence of digital video frames within the sliding time window, the video cut detection system can determine scene characteristics (e.g., feature vectors) and a cut probability of a video cut, as described above. The video cut detection system can then mark the timeline of the video clip to indicate boundaries between digital video frames where a video cut exists.

In one example, the video cut detection system stores feature vectors for a current sequence of digital video frames within the sliding time window, so that the feature vectors are available for a subsequent sequence of digital video frames. For instance, suppose eight digital video frames with indicators i to i+7 are included in a current sequence of digital video frames within the sliding time window. The video cut detection system can generate feature vectors for each of these eight digital video frames, and store the feature vectors in a cache memory. The video cut detection system can then move the sliding window to determine a subsequent sequence of digital video frames within the sliding time window, such as the eight digital video frames with indicators i+1 to i+8. Since the feature vectors for the digital video frames corresponding to indicators i+1 to i+7 were previously generated and stored in the cache memory, these feature vectors do not need to be re-generated for the subsequent sequence of digital video frames, and instead can be retrieved from the cache memory. Hence, the video cut detection system can be efficiently implemented to not waste resources.

Additionally or alternatively, the video cut detection system can move the sliding time window by a first amount corresponding to a coarse step that spans multiple digital video frames. The video cut detection system can then move the sliding window back by the first amount corresponding to the coarse step, and then forward by a second amount corresponding to a fine step. For example, in a coarse mode, the video cut detection system can move the sliding time window by an amount of time corresponding to four digital video frames. Based on whether the video cut detection system detects a video cut in the coarse mode, the video cut detection system can move the sliding time window back by the amount of time corresponding to the four digital video frames, and then in a fine mode move the sliding time window forward by an amount of time corresponding to one digital video frame to confirm the location of a video cut. Hence, the video cut detection system can be implemented to quickly and accurately process a video clip to determine video cuts in the video clip.

In an example, the video cut detection system is implemented to determine multi-frame video cuts in a video clip, such as wipes and fades that can span across more than two digital video frames. For instance, the video cut detection system can generate, with a neural network, multiple cut probabilities, such as a cut probability of a wipe video cut, a cut probability of a fade video cut, and the like. By comparing the cut probabilities to cut thresholds, such as a different threshold for each different type of multi-frame cut, the video cut detection system can determine whether a multi-frame cut exists in a sequence of digital video frames, including whether the multi-frame cut spans two adjacent digital frames having a boundary centered in the sequence of digital video frames.

The video cut detection system can generate training sequences of digital video frames to train a neural network that generates the feature vectors and the cut probabilities. The video cut detection system can generate training sequences that do not include a video cut and label these training sequences with a false cut label. For example, the video cut detection system can generate a training sequence that includes sequential digital video frames without a cut from a single video source.

The video cut detection system can also generate training sequences labeled with a true cut label that have a video cut centered in the training sequence. For example, the video cut detection system can generate a training sequence that includes a first sequence of digital video frames and a second sequence of digital video frames and join the first and second sequences at the center of the training sequence. The first and second sequences of digital video frames can be obtained from a single video clip (such as from different portions of the single video clip), or from two video clips, such as two unrelated video clips.

The video cut detection system can also generate training sequences labeled with a false cut label that have a video cut that is off-center in the training sequences. For example, the video cut detection system can generate a training sequence that includes a first sequence of digital video frames and a second sequence of digital video frames and join the first and second sequences at a location that is not centered in the training sequence. The first and second sequences of digital video frames can be obtained from a single video clip (such as from different portions of the single video clip), or from two video clips, such as two unrelated video clips.

The false cut label and the true cut label can be machine-generated labels, rather than user-generated. Hence, the video cut detection system can generate the training sequences of digital video frames automatically and without user interaction. Since humans are prone to making errors when identifying and labeling video cuts, because the human mind is conditioned to subconsciously not see video cuts when viewing video clips, the video cut detection system can generate the training sequences of digital video frames in an accurate an unbiased way.

In an example, the video cut detection system generates a training sequence of digital video frames that includes a digital video frame that is repeated in the training sequence of digital video frames. By repeating a digital video frame, e.g., by copying the digital video frame, the video cut detection system can generate a training sequence that simulates slow motion.

The video cut detection system can generate cut probabilities for the training sequences, and evaluate a loss function based on the cut probability and at least one of the false cut label or the true cut label associated with the training sequences. In one example, the video cut detection system evaluates a binary cross entropy loss function from the generated cut probabilities and the true or false cut labels of the training sequences, and updates at least one coefficient of the neural network based on results of evaluating the loss function.

By training a neural network to generate feature vectors and cut probabilities with training sequences that include various types of cuts, centered and not centered, the video cut detection system can accurately determine whether video cuts exist in a video clip, and precisely determine the locations of the video cuts, such as the boundaries between adjacent digital video frames. Moreover, by storing feature vectors when they are generated for a first sequence of digital video frames, the video cut detection system can retrieve from storage, rather than regenerate, the feature vectors for subsequent sequences that may include one or more digital video frames that are also included in the first sequence of digital video frames. Furthermore, the video cut detection system can detect multi-frame video cuts, such as fades or wipes that can span three of more digital video frames. Hence, the video cut detection system can be used in video editing workflows that require full automation without user interaction, and that require explicit location of video cuts, unlike conventional video cut detection systems.

Although the systems, devices, and techniques described herein are implemented for determining video cuts in video clips, the systems, devices, and techniques described herein are not so limited, and can be implemented for various automatic error checking of video clips. For example, the systems, devices, and techniques described herein can be used for determining duplicated frames in video clips. In this example, the video cut detection system can be implemented to determine a boundary between two adjacent frames of a video clip that are duplicated frames (e.g., the duplicated frames depict the same content and have the same pixel values).

In one example, the systems, devices, and techniques described herein can be used for determining skip frames in video clips. A skip frame refers to a video frame that has been dropped or omitted from a video clip. For instance, the video cut detection system can be implemented to determine a boundary between two adjacent frames of a video clip where one or more skip frames have been omitted from the video clip. Additionally or alternatively, the systems, devices, and techniques described herein can be used for determining flash frames in video clips. A flash frame refers to one or more frames that may be inadvertently inserted into the video clip, such as the result of an editing mistake. For instance, the video cut detection system can be implemented to determine a boundary between two adjacent frames of a video clip that indicates one of the adjacent frames as a flash frame.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ the techniques described herein. As used herein, the term "digital medium environment" refers to the various computing devices and resources that can be utilized to implement the techniques described herein. The illustrated digital medium environment 100 includes a computing device 102 depicted as a desktop computer, which is an example computing device. Computing device 102 can generally include any suitable type of computing device, such as a mobile phone, tablet, laptop computer, desktop computer, goggles, glasses, camera, digital assistant, image editor, non-linear editor, digital audio workstation, copier, scanner, client computing device, and the like. Hence, the computing device 102 can range from full resource devices with substantial memory and processor resources (e.g., personal computers, game consoles, etc.) to low-resource devices with limited memory or processing resources (e.g., mobile devices).

Notably, the computing device 102 can include any suitable number of computing devices, such as one or more computing devices, (e.g., a smart phone connected to a tablet). Furthermore, discussion of one computing device of the computing device 102 is not limited to that one computing device, but generally applies to each of the computing devices included in the computing device 102. Additionally or alternatively, the computing device 102 can be representative of one or a plurality of different devices connected to a network that perform operations "over the cloud" as further described in relation to FIG. 7. In one example, the computing device 102 includes multiple computing devices communicatively coupled to each other, such as with a low power wireless communication standard (e.g., a Bluetooth® protocol). Hence, an asset (e.g., digital video frame, video clip, text, drawing, artwork, document, file, and the like) generated, processed, edited, or stored on one device of the computing device 102 (e.g., a desktop computer) can be communicated to, and displayed on and processed by another device of the computing device 102 (e.g., a tablet).

The computing device 102 includes a video cut detection system 104 for determining video cuts in video clips. The video cut detection system 104 includes computer-readable storage media 106, which can include any suitable application for determining video cuts in video clips, such as video cut detection application 108. The computer-readable storage media 106 can include any suitable type of storage accessible by or included in the video cut detection system 104. The computer-readable storage media 106 stores data and provides access to and from memory included in the computer-readable storage media 106 for any suitable type of data. For instance, the computer-readable storage media 106 can include data used by or generated by the video cut detection application 108. The computer-readable storage media 106 can also include or have access to any suitable data for determining video cuts in video clips, such as neural networks (e.g., architecture definitions and coefficients), feature vectors, cut probabilities, values of cut thresholds, sliding time windows, training sequences of digital video frames, video clips of digital video frames, and the like.

The video cut detection system 104 also includes a display 110, which can display any suitable data used by or associated with the video cut detection system 104. In one example, the display 110 displays a user interface for determining video cuts in video clips. The display 110 can include any suitable type of display, such as a touchscreen, liquid crystal display, plasma display, head-mounted display, wearable display, projector and screen, and the like.

The video cut detection system 104 also includes one or more processors 112, which can include any suitable type of processor, such as a graphics processing unit, central processing unit, digital signal processor, processor core, combinations thereof, and the like. Hence, the video cut detection system 104 may be implemented at least partially by executing instructions stored in the computer-readable storage media 106 on the processors 112. For instance, the processors 112 may execute portions of the video cut detection application 108.

Furthermore, the video cut detection system 104 includes a transceiver module 114, which can be implemented to transmit and receive data using any suitable type and number of communication protocols. For instance, data within the video cut detection system 104 can be transmitted to a server with the transceiver module 114. Furthermore, data can be received from a server with the transceiver module 114. The transceiver module 114 can also transmit and receive data between computing devices of the computing device 102. In one example, transceiver module 114 includes a low power wireless communication standard (e.g., a Bluetooth® protocol) for communicating data between computing devices of the computing device 102.

The computing device 102 is also coupled to a network 116, which communicatively couples the computing device 102 with a server 118. The network 116 can include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

The server 118 can include one or more servers or service providers that provide services, resources, assets, or combinations thereof to the computing device 102. Services, resources, or assets may be made available from the server 118 to the video cut detection system 104, and stored at assets 120 of the server 118. For instance, digital video frames, video clips, training sequences, image editing applications, etc. in part or in whole can be stored at the assets 120 and made available to the computing device 102. Hence, the video cut detection system 104 can include any suitable asset stored at the assets 120 of the server 118.

The server 118 can include a video cut detection support system 122 configurable to receive signals from the computing device 102, process the received signals, and send the processed signals to the computing device 102 to support determining video cuts in video clips. For instance, the computing device 102 can obtain a sequence of digital video frames and communicate them along with any suitable data to the server 118. The server 118, using the video cut detection support system 122, can determine a probability of a video cut between two adjacent digital video frames having a boundary between the two adjacent digital video frames that is centered in the sequence of digital video frames. The server 118 can then communicate the probability of the video cut to the computing device 102, which can compare the probability of the video cut to a cut threshold to determine whether a video cut exists between the two adjacent digital video frames. Accordingly, the video cut detection support system 122 of the server 118 can include a copy of the video cut detection system 104.

The computing device 102 includes the video cut detection system 104 for determining video cuts in video clips. The video cut detection system 104 can be a standalone system, or a plug-in to an additional system. For example, the video cut detection system 104 can be included in a video editing system, such as by incorporating the video cut detection system 104 into Adobe Premiere®.

In the example illustrated in FIG. 1, the video cut detection system 104 receives a video clip 124 that includes a sequence of digital video frames, including digital video frame 126, digital video frame 128, digital video frame 130, and digital video frame 132 (collectively digital video frames 126-132). The video clip 124 is an example of a user-provided video clip, and the sequence of digital video frames 126-132 is an example of a sequence of digital video frames included within a sliding time window that can be moved across a timeline of the video clip 124 to the select digital video frames. In the video clip 124, the digital video frame 126 and the digital video frame 128 depict a first scene, e.g., a bird flying across the sun towards a tree. The digital video frame 130 and the digital video frame 132 depict a second scene, e.g., a truck driving towards a house. Accordingly, the video clip 124 includes a video cut 134 at the boundary between the digital video frame 128 and the digital video frame 130.

The video cut detection system 104 can determine scene characteristics for the digital video frames 126-132, such as by generating a respective feature vector for each of the digital video frames 126-132. In one example, the video cut detection system 104 determines that a feature vector for one of the digital video frames, e.g., the digital video frame 126, was previously generated and is stored in a memory of the computing device 102. Hence, the video cut detection system 104 can generate the feature vectors for the digital video frames 128-132, and retrieve the feature vector for the digital video frame 126 from the memory for a current position of the sliding time window that includes the digital video frames 126-132.

The video cut detection system 104 can determine, based on the scene characteristics for the digital video frames 126-132 (e.g., the feature vectors corresponding to the digital video frames 126-132), a probability of a video cut between the two adjacent digital video frames having a boundary between the two adjacent digital video frames that is centered in the sequence of digital video frames 126-132. In other words, the video cut detection system 104 can determine a probability of a video cut between the digital video frame 128 and the digital video frame 130, since these two adjacent digital video frames have a boundary centered in the sequence of digital video frames 126-132. In one example, the video cut detection system 104 generates the probability of a video cut with a neural network, such as a mobilenet V2 neural network.

The video cut detection system 104 can then compare the probability of the video cut to a cut threshold to determine whether the video cut 134 exists between the two adjacent digital video frames, e.g., the digital video frame 128 and the digital video frame 130. When the probability of the video cut is greater than the cut threshold (e.g., 0.999), the video cut detection system 104 can determine that the video cut 134 exists between the digital video frame 128 and the digital video frame 130. Alternatively, when the probability of the video cut is not greater than the cut threshold, the video cut detection system 104 can determine that the video cut 134 does not exist between the digital video frame 128 and the digital video frame 130. The video cut detection system 104 can mark a timeline of the video clip 124 to indicate boundaries between digital video frames that include a video cut, and boundaries between digital video frames that do not include a video cut. The video clip 124 with an annotated timeline can be used to edit the video clip 124, such as by synchronizing audio and video tracks.

Figure 2:
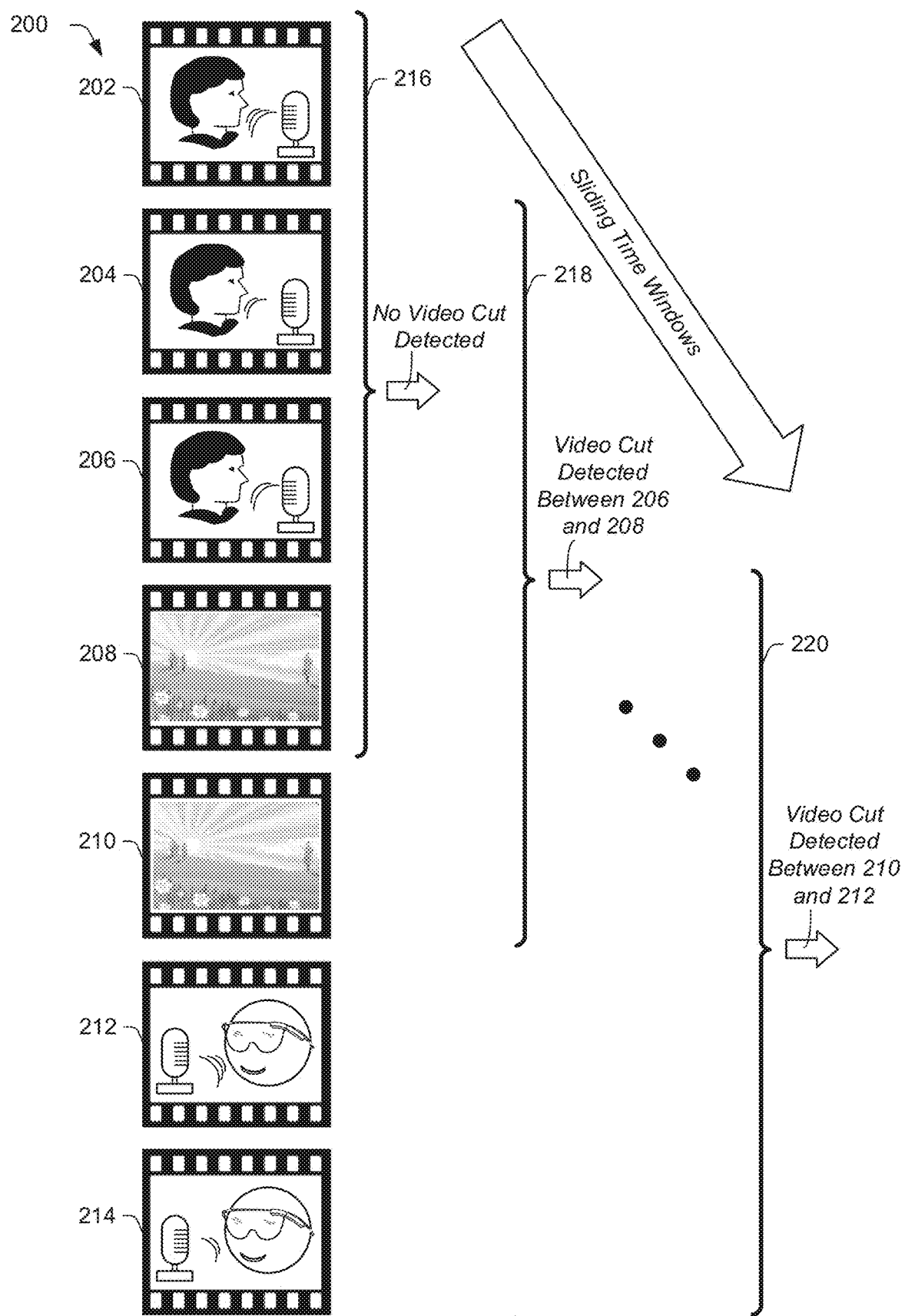
FIG. 2 illustrates an example video clip in accordance with one or more aspects of the disclosure.

FIG. 2 illustrates an example video clip 200 in accordance with one or more aspects of the disclosure. The video clip 200 includes a sequence of digital video frames, including digital video frame 202, digital video frame 204, digital video frame 206, digital video frame 208, digital video frame 210, digital video frame 212, and digital video frame 214 (collectively, digital video frames 202-214). The digital video frame 202, the digital video frame 204, and the digital video frame 206 depict a first scene, e.g., a person speaking into a microphone. The digital video frame 208 and the digital video frame 210 depict a second scene, e.g., a landscape with sunshine. The digital video frame 212 and the digital video frame 214 depict a third scene, e.g., another person speaking into a microphone. Hence, the video clip 200 includes two video cuts, one at the boundary between the digital video frame 206 and the digital video frame 208, and another video cut at the boundary between the digital video frame 210 and the digital video frame 212.

A sliding time window can be moved across a timeline of the video clip 200 to determine a sequence of digital video frames of the video clip 200 that are contained in the sliding time window for a given position of the sliding time window. The sequence of digital video frames contained in the sliding time window can be provided to the video cut detection system 104, which can determine feature vectors of the digital video frames and a probability of a video cut between two adjacent digital video frames having a boundary between the two adjacent digital video frames that is centered in the sequence of digital video frames. By moving the sliding time window across the timeline of the video clip 200, the video cut detection system 104 can determine the locations of video cuts at the boundaries of adjacent digital video frames.

For example, sliding time window 216 depicts a first position of the sliding time window along a timeline of the video clip 200, and at this first position, the four digital video frames 202-208 are contained in the sliding time window 216. Hence, the video cut detection system 104 can receive as input the four digital video frames 202-208 for the sliding time window 216, and generate a respective feature vector for each of the four digital video frames 202-208. The feature vectors can represent any suitable low-level features of the scenes depicted in the digital video frames, such as color, objects, lighting, lines, curves, shapes, gradients, textures, opacity, smoothness, displayed text, relative positioning between objects, etc. In one example, the video cut detection system 104 stores the feature vectors in a memory of the computing device 102, such as a cache memory included in the computer-readable storage media 106.

Based on the feature vectors generated for the four digital video frames 202-208, the video cut detection system 104 can determine a probability of a video cut between the two adjacent digital video frames having a boundary between the two adjacent digital video frames that is centered in the sequence of digital video frames 202-208, namely at the boundary between the digital video frame 204 and the digital video frame 206. The video cut detection system 104 can compare the probability of the video cut to a cut threshold to determine whether the video cut exists between the digital video frame 204 and the digital video frame 206. When the probability of the video cut is not greater than the cut threshold, the video cut detection system 104 can determine that a video cut does not exist between the digital video frame 204 and the digital video frame 206.

The sliding time window 218 depicts a second position of the sliding time window along a timeline of the video clip 200. For example, the sliding time window 216 has been moved by the time duration of one digital video frame to form the sliding time window 218 at the second position. At this second position on the timeline of the video clip 200, the four digital video frames 204-210 are contained in the sliding time window 218. Hence, the video cut detection system 104 can next receive as input the four digital video frames 204-210 for the sliding time window 218, and determine a respective feature vector for each of the four digital video frames 204-210.

In one example, since the feature vectors for the digital video frames 204-208 were previously generated for the previous position of the sliding time window, e.g., the sliding time window 216, the video cut detection system 104 for the sliding time window 218 retrieves the feature vectors for the digital video frames 204-208 from memory, rather than regenerating the feature vectors, thus saving processing resources. Additionally or alternatively, when processing the four digital video frames 204-210 for the sliding time window 218, the video cut detection system 104 can determine that the memory does not include a feature vector for the digital video frame 210, since the digital video frame 210 was not contained in a previous position of the sliding time window. Responsive to determining that the memory does not include a feature vector for the digital video frame 210, the video cut detection system 104 can generate a feature vector for the digital video frame 210, such as with a neural network.

Based on the feature vectors determined for the four digital video frames 204-210, the video cut detection system 104 can determine a probability of a video cut between the two adjacent digital video frames having a boundary between the two adjacent digital video frames that is centered in the sequence of digital video frames 204-210, namely at the boundary between the digital video frame 206 and the digital video frame 208. The video cut detection system 104 can compare the probability of the video cut to a cut threshold (e.g., 0.999) to determine whether the video cut exists between the digital video frame 206 and the digital video frame 208. When the probability of the video cut is greater than the cut threshold, the video cut detection system 104 can determine that a video cut exists between the digital video frame 206 and the digital video frame 208.

The sliding time window 220 depicts a subsequent position of the sliding time window along a timeline of the video clip 200. For example, the sliding time window 220 has been moved from the sliding time window 218. At this subsequent position on the timeline of the video clip 200, the four digital video frames 208-214 are contained in the sliding time window 220. Hence, the video cut detection system 104 can next receive as input the four digital video frames 208-214 for the sliding time window 220, and determine a respective feature vector for each of the four digital video frames 208-214. As discussed above, the video cut detection system 104 can check the contents of memory of the computing device, e.g., cache memory, to determine if any of the feature vectors for the four digital video frames 208-214 have been previously generated. If a feature vector has been previously generated and is stored in the memory, the video cut detection system 104 can retrieve the feature vector from memory. If a feature vector is not stored in the memory, then the video cut detection system 104 can generate the feature vector with a neural network.

Based on the feature vectors determined for the four digital video frames 208-214, the video cut detection system 104 can determine a probability of a video cut between the two adjacent digital video frames having a boundary between the two adjacent digital video frames that is centered in the sequence of digital video frames 208-214, namely at the boundary between the digital video frame 210 and the digital video frame 212. The video cut detection system 104 can compare the probability of the video cut to a cut threshold (e.g., 0.999) to determine whether the video cut exists between the digital video frame 210 and the digital video frame 212. When the probability of the video cut is greater than the cut threshold, the video cut detection system 104 can determine that a video cut exists between the digital video frame 210 and the digital video frame 212.

The video cut detection system 104 can move the sliding time window by a time duration corresponding to any suitable number of digital video frames. For instance, the sliding time window 216 is moved by the time duration of one digital video frame to form the sliding time window 218. Additionally or alternatively, the video cut detection system 104 can implement a coarse mode of operation in which the sliding time window is moved by a time duration corresponding to multiple digital video frames. For example, the sliding time window 220 is an example of a sliding time widow that has been moved from the position of the sliding time window 218 by the time duration of two digital video frames.

If a video cut is detected or is not detected at a position of the sliding time window while in a coarse mode, the video cut detection system 104 can switch to a fine mode of operation, in which the sliding time window is moved back to its previous position and then slid forward in time by the time duration of one digital video frame. For example, since the video cut detection system 104 detects a video cut between the digital video frame 210 and the digital video frame 212 for the sliding time window 220, the video cut detection system 104 can switch from a coarse mode to a fine mode and move the siding time window from the position of the sliding time window 220 to a previous position of the sliding time window, such as back to the position of the sliding time window 218 or even back to the position of the sliding time window 216. In a fine mode, the video cut detection system 104 can increment the position of the sliding time window along the timeline of the video clip by the time duration of one digital video frame, to finely search for video cuts in sequences of digital video frames.

In an example, since the video cut detection system 104 determines whether a video cut exists between two adjacent digital video frames having a boundary between the two adjacent digital video frames that is centered in the sequence of digital video frames received as input, the video cut detection system 104 can add or remove a digital video frame from the sequence of digital video frames so that the sequence includes an even number of digital video frames. In one example, the video cut detection system 104 is implemented to move the sliding time window so that it contains a sequence of eight digital video frames of a video clip. Each sequence of eight digital video frames formed by the sliding time window can be input to a neural network to determine feature vectors and a probability of a video cut between the centered two adjacent digital video frames of each sequence of eight digital video frames. Thus, by moving the sliding time window across the video clip 200, all of the digital video frames of the video clip 200 can be processed by the neural network to determine video cuts at the boundaries between the digital video frames in the video clip 200.

Example Video Cut Detection System

Figure 3:
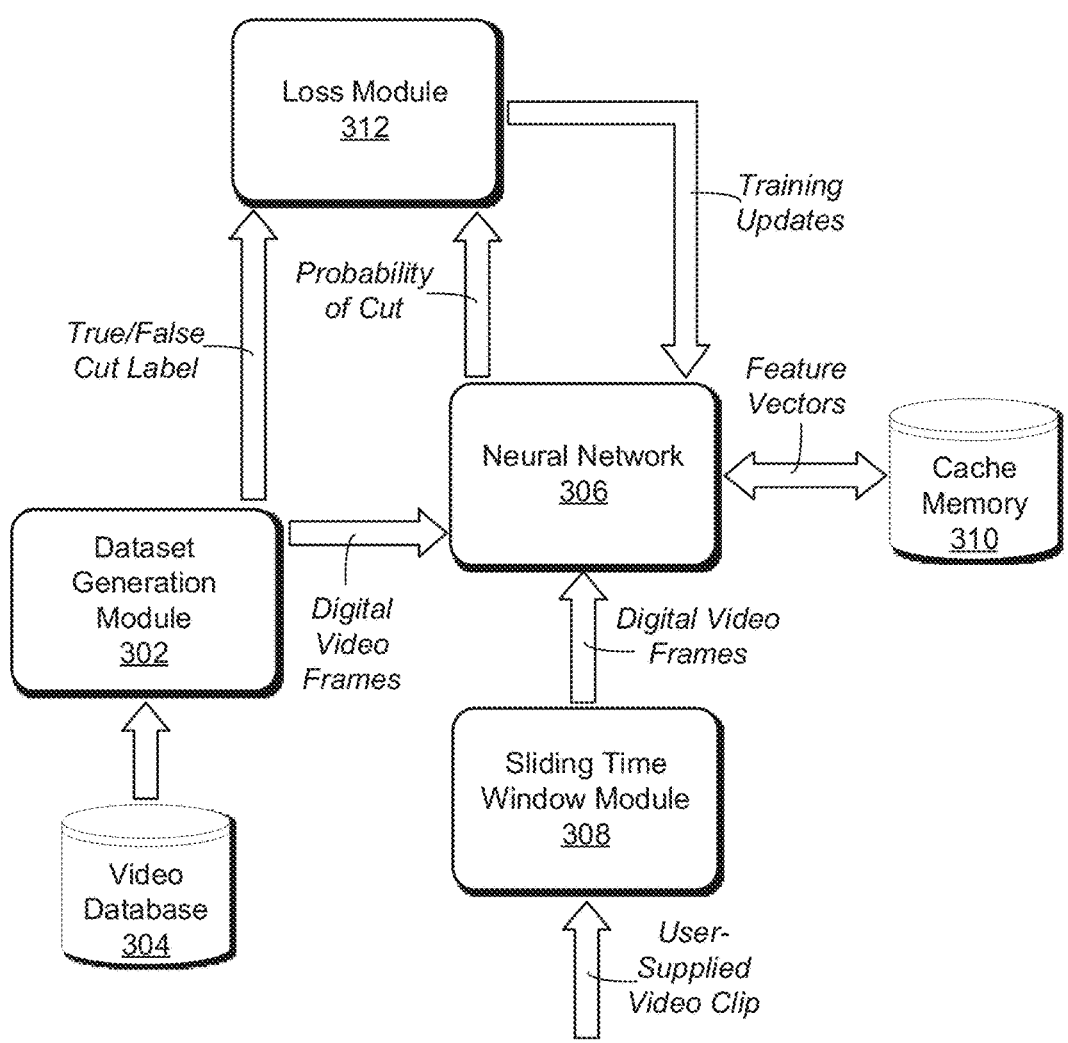
FIG. 3 illustrates an example system usable for determining video cuts in video clips in accordance with one or more aspects of the disclosure.

FIG. 3 illustrates an example system 300 usable for determining video cuts in video clips in accordance with one or more aspects of the disclosure. In this implementation, the system 300 includes dataset generation module 302, video database 304, neural network module 306, sliding time window module 308, cache memory 310, and loss module 312. These modules and blocks can be implemented as any type of module or component in software (e.g., as software instructions that are executable with a processing system), hardware, or combinations thereof, as a standalone application or as a module or component of another device application, and in any type of computing device. The system 300 is one example of the video cut detection system 104 that can be constructed using these modules. For instance, signals can be redefined, and modules can be modified, combined, divided, added, or removed to form a modified system, without altering the functionality of the system 300. Accordingly, such modified systems are considered to be within the scope of the disclosure. Furthermore, for simplicity, the system 300 is limited to these modules and a description of some of their interconnects. The system 300 can, however, include any suitable signals and communications between modules omitted for simplicity. Such signals can include system clocks, counters, digital video frame indicators, sequence indicators, reset signals, and the like.

The system 300 can be implemented on any suitable device or devices. In one example, the system 300 is implemented on one computing device (e.g., the computing device 102 in FIG. 1). In another example, the system 300 is implemented on more than one computing device. For instance, parts of the system 300 can be implemented by a first computing device, such as one computing device of the computing device 102 in FIG. 1, and other parts of the system 300 can be implemented by an additional computing device of the computing device 102. In one example, a server implements the system 300, such as the server 118 in FIG. 1. A server may be implemented to receive signals of the system 300 from a computing device (e.g., computing device 102), process the received signals, such as with the video cut detection support system 122, and transmit results of the processing back to the computing device. Hence, the video cut detection support system 122 of server 118 in FIG. 1 can include the system 300.

The system 300 can be implemented to determine video cuts in video clips in a deployment setting, such as on a client computing device for a user-provided video clip. Additionally or alternatively, the system 300 can be implemented to determine video cuts in video clips in a training setting, in which parameters of the system 300, such as coefficients of the neural network module 306, can be adjusted over time based on the probability of cuts generated by the neural network module 306. For example, the system 300 can be implemented on a server to train a neural network to determine video cuts in video clips, and the server can provide the pre-trained neural network to a client computing device, such as the computing device 102.

The dataset generation module 302 can be implemented to generate training sequences of digital video frames. Hence, the dataset generation module 302 can receive videos from a video database 304, and generate the training sequences from digital video frames of the videos received from the video database 304. The dataset generation module 302 can also label each training sequence of digital video frames with a cut label indicating true or false. A true cut label can indicate that the training sequence includes a video cut that is centered in the training sequence, e.g., the training sequences of digital video frames includes two adjacent digital video frames having a boundary between the two adjacent digital video frames that is centered in the training sequence and a video cut exists at the boundary. A false cut label can indicate that the training sequence does not include a video cut that is centered in the training sequence. The dataset generation module 302 can generate the false cut label and the true cut label as machine-generated labels, rather than user-generated labels. Hence, the dataset generation module 302 can generate the training sequences of digital video frames and their corresponding cut labels automatically and without user interaction. For instance, the dataset generation module 302 can receive videos from the video database 304, and automatically generate training sequences that include a fixed number of digital video frames, such as eight digital video frames, and cut labels for the training sequences. The digital video frames can be any suitable size, such as including 340×190 pixels.

In one example, the dataset generation module 302 generates training sequences that do not include a video cut and labels these training sequences with a false cut label. For example, the dataset generation module 302 can generate a training sequence that includes sequential digital video frames without a video cut. The digital video frames can come from a single video source, such as a single video provided by the video database 304.

Additionally or alternatively, the dataset generation module 302 can generate training sequences labeled with a true cut label that have a video cut centered in the training sequence. For example, the dataset generation module 302 can generate a training sequence that includes a first sequence of digital video frames and a second sequence of digital video frames and join the first and second sequences at the center of the training sequence. The first and second sequences of digital video frames can be obtained from a single video clip, such as from different portions of a single video clip provided by the video database 304. Additionally or alternatively, the dataset generation module 302 can obtain the first and second sequences of digital video frames from two video clips, such as from two separate, unrelated videos provided by the video database 304.

In an example, the dataset generation module 302 generates training sequences labeled with a false cut label that have a video cut that is off-center in the training sequences. For example, the dataset generation module 302 can generate a training sequence that includes a first sequence of digital video frames and a second sequence of digital video frames and join the first and second sequences at a location that is not centered in the training sequence. The dataset generation module 302 can obtain the first and second sequences of digital video frames from a single video clip, such as from different portions of a single video clip provided by the video database 304. Additionally or alternatively, the dataset generation module 302 can obtain the first and second sequences of digital video frames from two video clips, such as from two separate, unrelated videos provided by the video database 304.

In one example, the dataset generation module 302 generates a training sequence of digital video frames that includes a digital video frame that is repeated in the training sequence of digital video frames. By repeating a digital video frame, e.g., by copying the digital video frame, the dataset generation module 302 can generate a training sequence that simulates slow motion.

Additionally or alternatively, the dataset generation module 302 can generate a training sequence of digital video frames that include overlaid text to simulate subtitles. In an example, the dataset generation module 302 makes photometric adjustments to a training sequence of digital video frames, such as by adjusting lighting, contrast, brightness, color, and the like of digital video frames.

The dataset generation module 302 provides the digital video frames of the training sequences to the neural network module 306. The dataset generation module 302 can concatenate the pixel values of the digital video frames of the training sequences when providing the digital video frames of the training sequences to the neural network module 306. The dataset generation module 302 also provides the cut labels (e.g., true cut labels and false cut labels) that correspond to the training sequences to the loss module 312.

The sliding time window module 308 can be implemented to move a sliding time window across a timeline of a video clip to determine digital video frames of the video clip contained in the sliding time window. For example, the sliding time window module 308 can receive a user-supplied video clip, such as from a user loading the video clip into the system 300 and instructing the system to determine video cuts in the video clip. The sliding time window module 308 can then move the sliding time window to a position of the timeline of the video clip, and determine digital video frames of the video clip contained in the sliding time window. In one example, the sliding time window module 308 sets the length of the sliding time window so that it contains eight digital video frames. The sliding time windows 216, 218, and 220 in FIG. 2 are examples of a sliding time window positioned by the sliding time window module 308. In one example, the sliding time window module 308 sets the size of the digital video frames to 340×190 pixels. The sliding time window module 308 provides digital video frames of a video clip contained in a sliding time window to the neural network module 306.

The neural network module 306 receives digital video frames of the training sequences from the dataset generation module 302, digital video frames of a video clip contained in a sliding time window from the sliding time window module 308, or both digital video frames of training sequences from the dataset generation module 302 and digital video frames of a video clip contained in a sliding time window from the sliding time window module 308. When the neural network module 306 is operating in a deployment mode, the neural network module 306 can receive the digital video frames of a video clip contained in a sliding time window from the sliding time window module 308. When the neural network module 306 is operating in a training mode, the neural network module 306 can receive digital video frames of the training sequences from the dataset generation module 302.

The neural network module 306 can be implemented to generate, with a neural network, feature vectors for digital video frames of a sequence of digital video frames, and a probability of a video cut between two adjacent digital video frames having a boundary between the two adjacent digital video frames that is centered in the sequence of digital video frames. The neural network module 306 can include any suitable neural network. In one example, the neural network module 306 includes a mobilenet V2 neural network. Mobilenet V2 is a network architecture developed by Google® that uses depthwise separable convolution as efficient building blocks, linear bottlenecks between the layers, and shortcut connections between the bottlenecks.

The neural network module 306 can provide feature vectors it generates to the cache memory 310. The feature vectors can represent any suitable low-level features of the scenes depicted in the digital video frames, such as color, objects, lighting, lines, curves, shapes, gradients, textures, opacity, smoothness, displayed text, relative positioning between objects, etc. Additionally or alternatively, the neural network module 306 can retrieve feature vectors from the cache memory 310. Hence, the neural network module 306 can generate feature vectors for digital video frames corresponding to one position of the sliding time window determined by the sliding time window module 308, and store these feature vectors in the cache memory 310 so that they can be retrieved for a subsequent position of the sliding time window determined by the sliding time window module 308. Accordingly, the neural network module 306 can generate feature vectors for the digital video frames of a video clip only once per digital video frame, even though the digital video frame may be included in multiple sequences of digital video frames determined for multiple positions of the sliding time window by the sliding time window module 308.

Based on the feature vectors for a sequence of digital video frames, the neural network module 306 can determine, with the neural network, a probability of a video cut between two adjacent digital video frames having a boundary between the two adjacent digital video frames that is centered in the sequence of digital video frames. Additionally or alternatively, the neural network module 306 can be implemented to determine cut probabilities for multi-frame video cuts, such as wipes and fades that can span across more than two digital video frames. For instance, the neural network module 306 can generate, with a neural network, multiple cut probabilities, such as a cut probability of a wipe video cut, a cut probability of a fade video cut, and the like.

The neural network module 306 can compare a probability of a video cut to a cut threshold to determine whether a video cut exists between the two adjacent digital video frames centered in a sequence of the digital video frames. For multi-frame cuts, the neural network module 306 can compare the multi-frame cut probabilities to cut thresholds, such as a different threshold for each different type of multi-frame cut. The neural network module 306 can then determine whether a multi-frame cut exists in a sequence of digital video frames, including whether the multi-frame cut spans the two adjacent digital frames having a boundary centered in the sequence of digital video frames. The neural network module 306 provides the probabilities of video cuts to the loss module 312.

The loss module 312 receives the probabilities of video cuts from the neural network module 306, and cut labels from the dataset generation module 302, and can be implemented to evaluate a loss function based on the probability of a video cut and the cut labels. The loss module 312 can evaluate any suitable loss function. In one example, the loss module 312 evaluates a binary cross entropy loss function, such as $$\mathcal{L} = \sum_i -(y_i \cdot \log(p_i) + (1 - y_i) \cdot \log(1 - p_i))$$

where i denotes a training sequence number, $y_i$ denotes the cut label corresponding to the training sequence, such as 0 for true and 1 for false, and $p_i$ denotes the cut probability generated for the training sequence by the neural network.

Based on the evaluation of the loss function, the loss module 312 can generate training updates, such as adjustment terms that when applied to the neural network of the neural network module 306 minimize the loss function. For example, the loss module 312 can minimize the loss function via a stochastic gradient descent of the loss function. Additionally or alternatively, the loss module 312 can generate a training update for the neural network module 306 on a block basis, such as for every ten training sequences processed by the neural network module 306. The loss module 312 provides the training updates to the neural network module 306, which can adjust at least one coefficient (e.g., a convolution coefficient) based on the training updates.

The systems described herein constitute improvements over conventional video cut detection systems that rely on histograms of colors for determining video cuts in video clips. Rather, the systems described herein train a neural network to determine feature vectors for a sequence of digital video frames, and a probability of a video cut between two adjacent digital video frames having a boundary between the two adjacent digital video frames that is centered in the sequence of digital video frames. Hence, the systems described herein can determine video cuts in video clips that have various types of video content, such as fast camera motion, subtitles and overlaid text, on-screen graphics, and the like, which typically result in failures by conventional video cut detection systems, such as false video cut detection or missed video cuts. Moreover, the systems described herein can be fully automated and do not require manual tuning of thresholds, like conventional video cut detection systems that rely on histograms of colors for determining video cuts in video clips.

Furthermore, the systems described herein constitute improvements over conventional video cut detection systems that are limited to detecting hard video cuts and fail for multi-frame video cuts. Rather, the systems described herein can determine multi-frame video cuts that span multiple digital video frames, such as fades and wipes. Moreover, the systems described herein determine the exact location of a video cut in a video clip, and are not limited to merely identifying a time window in which a video cut can exist, like many conventional video cut detection systems. Hence, the systems described herein can be used in many video editing workflows in which conventional video cut detection systems are not suitable.

Example Procedures

Figure 4:
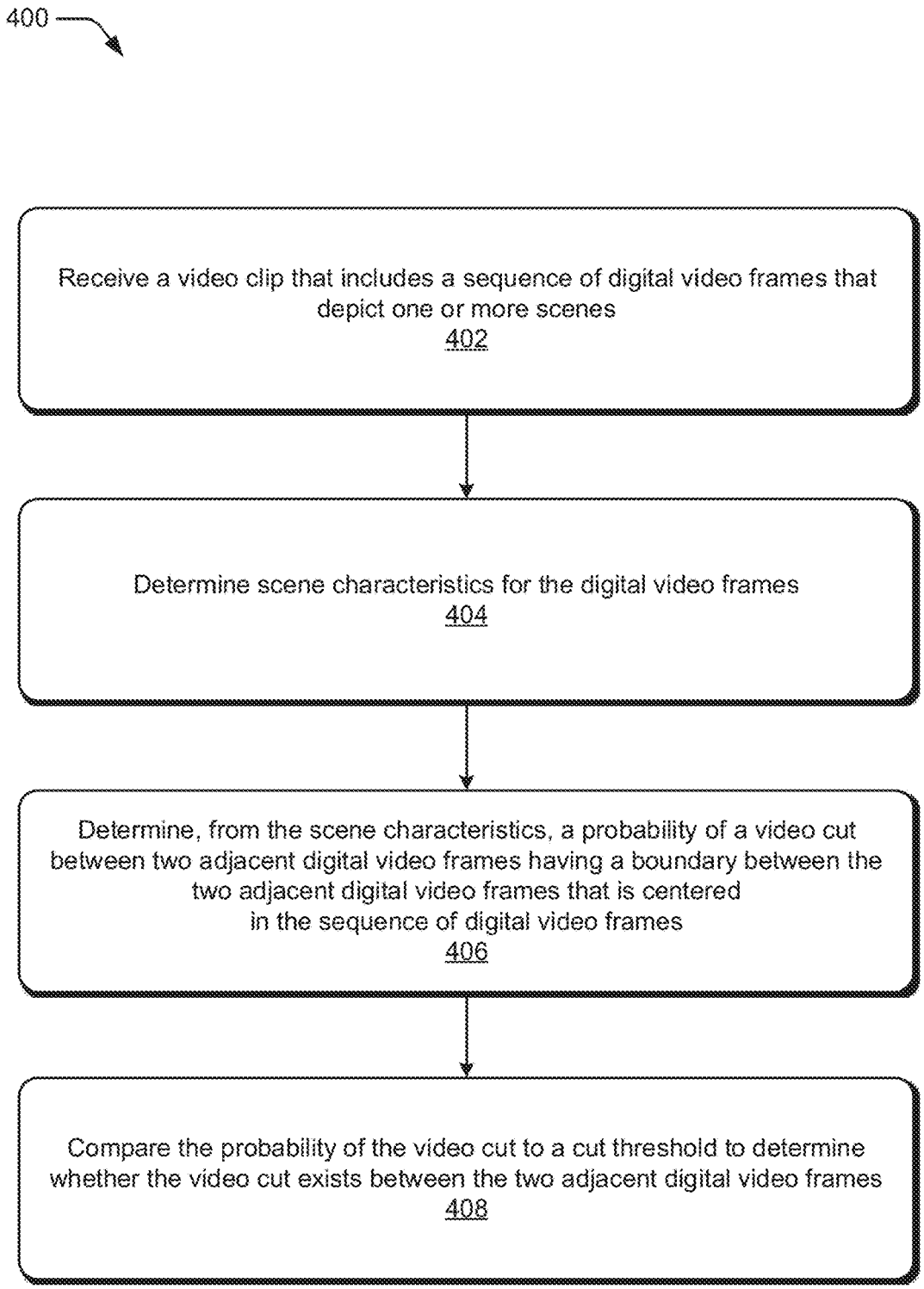
FIG. 4 illustrates a flow diagram depicting an example procedure in accordance with one or more aspects of the disclosure.

FIG. 4 illustrates an example procedure 400 for determining video cuts in video clips in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 102 or server 118 of FIG. 1 that makes use of a video cut detection system, such as system 300 or video cut detection system 104. A video cut detection system implementing the procedure 400 can be an independent application that has been installed on the computing device, a service hosted by a service provider that is accessible by the computing device, a plug-in module to the computing device, or combinations thereof.

A video clip that includes a sequence of digital video frames that depict one or more scenes is received (block 402). For example, a user may load a video clip that includes a sequence of digital video frames that depict one or more scenes into the video cut detection application 108. The video clip can be maintained in a memory of a computing device, such as the computer-readable storage media 106 of the computing device 102. In one example, the sliding time window module 308 moves a sliding time window across a timeline of the video clip to select the sequence of digital video frames as contained in the sliding time window.

Scene characteristics for the digital video frames are determined (block 404). For example, the neural network module 306 can determine scene characteristics for the digital video frames. The scene characteristics can be determined as feature vectors using a neural network of the neural network module 306.

A probability of a video cut between two adjacent digital video frames having a boundary between the two adjacent digital video frames that is centered in the sequence of digital video frames is determined from the scene characteristics (block 406). For example, the neural network module 306 can determine, from the scene characteristics, a probability of a video cut between two adjacent digital video frames having a boundary between the two adjacent digital video frames that is centered in the sequence of digital video frames.

The probability of the video cut is compared to a cut threshold to determine whether the video cut exists between the two adjacent digital video frames (block 408). For example, the neural network module 306 can compare the probability of the video cut to a cut threshold to determine whether the video cut exists between the two adjacent digital video frames. When the probability of the video cut is greater than the cut threshold, the neural network module 306 can determine that the video cut exists between the two adjacent digital video frames. When the probability of the video cut is not greater than the cut threshold, the neural network module 306 can determine that the video cut does not exist between the two adjacent digital video frames.

In one example, the sliding time window module 308 moves a sliding time window across a timeline of the video clip to determine the sequence of digital video frames as contained in the sliding time window. Moving the sliding time window across the timeline of the video clip to select a subsequent sequence of additional digital video frames of the video clip can be repeated. For the additional digital video frames and additional two adjacent digital video frames having an additional boundary that is centered in the subsequent sequence of additional digital video frames, determining the scene characteristics, determining the probability, and comparing can be repeated to determine whether an additional video cut exists between the additional two adjacent digital video frames. For instance, the sliding time window module 308 can move the sliding time window across the timeline of the video clip to select subsequent sequences of additional digital video frames of the video clip, and repeat the comparing based on repeating determining the scene characteristics and the determining the probability to determine whether an additional video cut exists between two adjacent digital video frames in a subsequent sequence of the additional digital video frames.

Additionally or alternatively, the subsequent sequence of the additional digital video frames of the video clip can include some but not all of the digital video frames included in the sequence of digital video frames. In an example, the repeating is continued until all of the digital video frames of the video clip are included in at least one subsequent sequence of additional digital video frames of the video clip.

In one example, the sliding time window module 308 moves a sliding time window from an initial position on a timeline of the video clip to select a subsequent sequence of additional digital video frames of the video clip as contained in the sliding time window. For the additional digital video frames and additional two adjacent digital video frames having an additional boundary that is centered in the subsequent sequence of additional digital video frames, the steps of determining the scene characteristics, determining the probability, and comparing to determine whether an additional video cut exists between the additional two adjacent digital video frames can be repeated.

Additionally or alternatively, the sliding time window module 308 can be implemented in a coarse mode and move the sliding time window from the initial position by an amount of time corresponding to multiple digital video frames of the digital video frames of the video clip, and the video cut detection system can determine the additional video cut exists between the additional two adjacent digital video frames based on the probability of the video cut being greater than the cut threshold. In an example, the video cut detection system can be implemented in a fine mode and move the sliding time window to a new position on the timeline that corresponds to an amount of time from the initial position of one of the digital video frames of the video clip, and determine another sequence of other digital video frames of the video clip as contained in the sliding time window. The video cut detection system can then repeat, for the other digital video frames and other two adjacent digital video frames having another boundary that is centered in the another sequence of other digital video frames, the determine the scene characteristics, the determine the probability, and the compare to determine whether an another video cut exists between the other two adjacent digital video frames.

In one example, a timeline of the video clip is marked to indicate the video cut exists between the two adjacent digital video frames when the probability of the video cut is greater than the cut threshold. Additionally or alternatively, the timeline of the video clip can be marked to indicate the video cut does not exist between the two adjacent digital video frames when the probability of the video cut is not greater than the cut threshold.

In an example, the neural network module 306 determines the scene characteristics as respective feature vectors for the digital video frames. The feature vectors represent features of the one or more scenes depicted in the digital video frames. The neural network module 306 can determine whether each feature vector of the feature vectors is stored in a cache memory of the computing device. If the feature vector is not stored in the cache memory, the neural network module 306 can generate the feature vector with a neural network, and store the feature vector in the cache memory for future use. If the feature vector is stored in the cache memory, the neural network module 306 can retrieve the feature vector from the cache memory. Additionally or alternatively, the neural network module 306 can generate, with the neural network, at least one of the feature vectors that are retrieved from the cache memory from an additional sequence of additional digital video frames of the video clip that includes some but not all of the digital video frames included in the sequence of digital video frames. For instance, the additional sequence of additional digital video frames can correspond to a previous position of a sliding time window of the sliding time window module 308.

In an example, the neural network is trained with at least one sequence of digital video frames that do not have a video cut between them, the at least one sequence of digital video frames labeled with a false cut label. The sequence of digital video frames that do not have a video cut between them can include a digital video frame that is repeated in the sequence of digital video frames, such as to simulate slow motion. Additionally or alternatively, the neural network can be trained with an additional sequence of digital video frames labeled with a true cut label that have a video cut centered in the sequence of digital video frames. Additionally or alternatively, the neural network can be trained with another sequence of digital video frames labeled with the false cut label that have a video cut that is off-center in the sequence of digital video frames.

In one example, the neural network module 306 determines, from the scene characteristics, a multi-frame probability of a multi-frame video cut across three or more of the digital video frames that include the two adjacent digital video frames. The neural network module 306 can then compare the multi-frame probability of the multi-frame cut to a multi-frame cut threshold to determine whether the multi-frame video cut exists across the three or more of the digital video frames. Examples of a multi-frame video cut include a fade, a wipe, and the like.

FIG. 5 illustrates an example procedure 500 for determining video cuts in video clips in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 102 or server 118 of FIG. 1 that makes use of a video cut detection system, such as system 300 or video cut detection system 104. A video cut detection system implementing the procedure 500 can be an independent application that has been installed on the computing device, a service hosted by a service provider that is accessible by the computing device, a plug-in module to the computing device, or combinations thereof.

A sliding time window is moved across a timeline of a video clip to select a sequence of digital video frames of the video clip that are contained in the sliding time window (block 502). For example, the sliding time window module 308 can move a sliding time window across a timeline of a video clip to select subsequent sequences of digital video frames of the video clip that are contained in the sliding time window.

Feature vectors are determined for the digital video frames that represent features of one or more scenes depicted in the digital video frames (block 504). For example, the neural network module 306 can determine, with a neural network, feature vectors for the digital video frames that represent features of one or more scenes depicted in the digital video frames.

A probability of a video cut between two adjacent digital video frames having a boundary between the two adjacent digital video frames that is centered in the sequence of digital video frames is determined from the feature vectors (block 506). For example, the neural network module 306 can determine, from the feature vectors, a probability of a video cut between two adjacent digital video frames having a boundary between the two adjacent digital video frames that is centered in the sequence of digital video frames.

The probability of the video cut is compared to a cut threshold to determine whether the video cut exists between the two adjacent digital video frames (block 508). For example, the neural network module 306 can compare the probability of the video cut to a cut threshold to determine whether the video cut exists between the two adjacent digital video frames. In an example, the cut threshold is set to a value of 0.999. The moving the sliding time window, the determining the feature vectors, the determining the probability of the video cut, and the comparing can be performed automatically and without user intervention.

In one example, the neural network module 306 generates at least one of the feature vectors from an additional sequence of additional digital video frames of the video clip that are contained in the sliding time window prior to the moving the sliding time window. The neural network module 306 can then store the at least one of the feature vectors in a memory of the computing device, so that determining the feature vectors for the digital video frames can include retrieving the at least one of the feature vectors from the memory of the computing device.

Additionally or alternatively, determining the feature vectors for the digital video frames can include generating at least one of the feature vectors with a neural network that is trained with at least one sequence of digital video frames that do not have a video cut between them, the at least one sequence of digital video frames labeled with a false cut label. Additionally or alternatively, the neural network can be trained with an additional sequence of digital video frames labeled with a true cut label that have a video cut centered in the additional sequence of digital video frames. Additionally or alternatively, the neural network can be trained with another sequence of digital video frames labeled with the false cut label that have a video cut that is off-center in the another sequence of digital video frames. The false cut label and the true cut label can be machine-generated labels, rather than user-generated labels.

Figure 6:
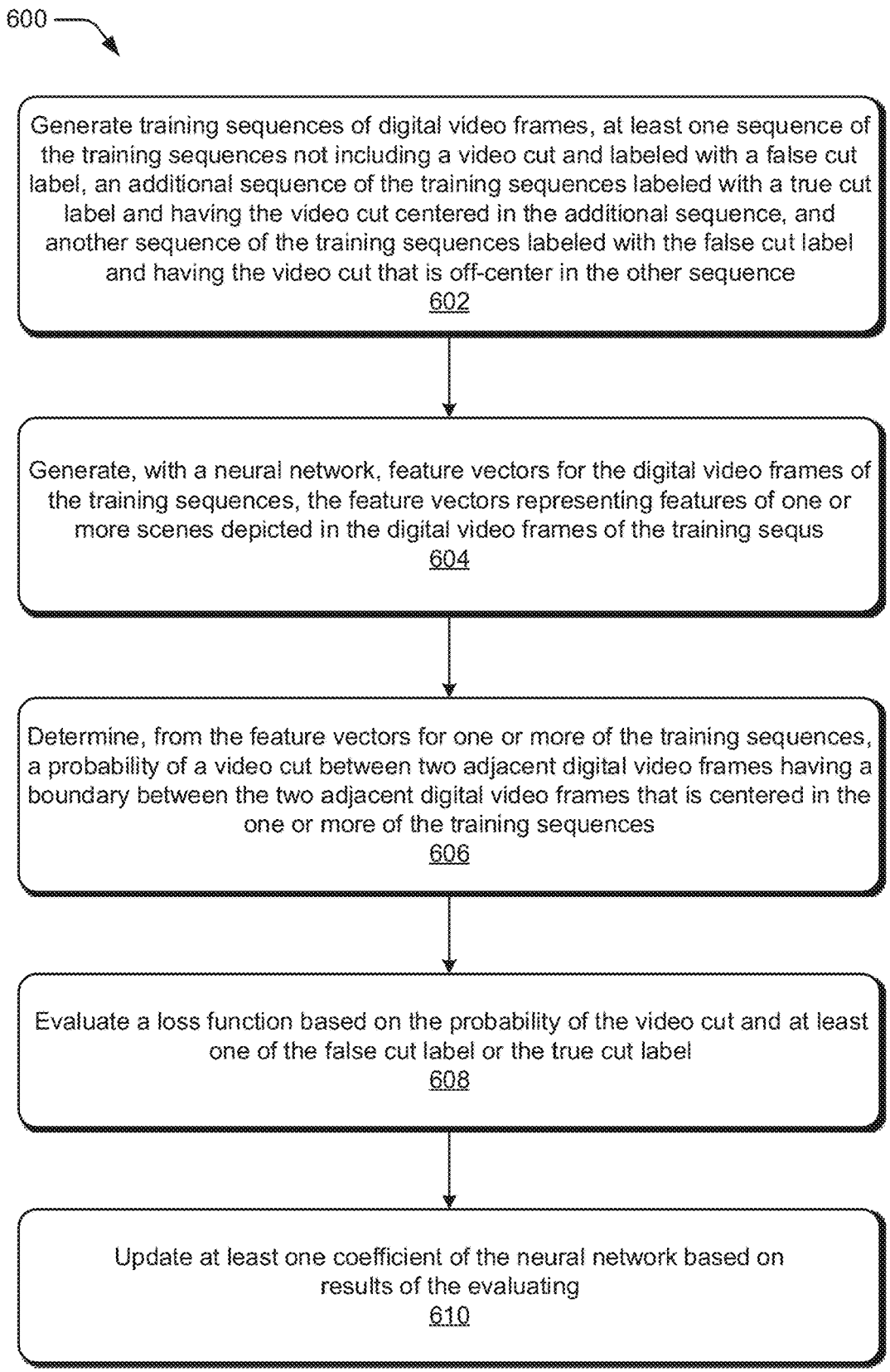
FIG. 6 illustrates a flow diagram depicting an example procedure in accordance with one or more aspects of the disclosure.

FIG. 6 illustrates an example procedure 600 for determining video cuts in video clips in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 102 or server 118 of FIG. 1 that makes use of a video cut detection system, such as system 300 or video cut detection system 104. A video cut detection system implementing the procedure 600 can be an independent application that has been installed on the computing device, a service hosted by a service provider that is accessible by the computing device, a plug-in module to the computing device, or combinations thereof.

Training sequences of digital video frames are generated (block 602). For example, the dataset generation module 302 can generate training sequences of digital video frames. In an example, at least one sequence of the training sequences does not include a video cut and is labeled with a false cut label. For instance, the at least one sequence can include digital video frames in sequence from a single video source, such as a video clip stored in the video database 304. Additionally or alternatively, an additional sequence of the training sequences can be labeled with a true cut label and have a video cut centered in the additional sequence. For instance, the additional sequence can include digital video frames from one or more video clips that are spliced together at the center of the additional sequence. Additionally or alternatively, another sequence of the training sequences can be labeled with the false cut label and have a video cut that is off-center in the other sequence. For instance, the other sequence can include digital video frames from one or more video clips that are spliced together at a location that is not at the center of the other sequence.

Feature vectors for the digital video frames of the training sequences are generated with a neural network (block 604). For example, the neural network module 306 can generate, with a neural network, feature vectors that represent features of one or more scenes depicted in the digital video frames of the training sequences.

A probability of a video cut between two adjacent digital video frames having a boundary between the two adjacent digital video frames that is centered in the one or more of the training sequences is determined from the feature vectors for one or more of the training sequences (block 606). For example, the neural network module 306 can determine, from the feature vectors for one or more of the training sequences, a probability of a video cut between two adjacent digital video frames having a boundary between the two adjacent digital video frames that is centered in the one or more of the training sequences.

A loss function is evaluated based on the probability of the video cut and at least one of the false cut label or the true cut label (block 608). For example, the loss module 312 can evaluate a loss function based on the probability of the video cut and at least one of the false cut label or the true cut label. In one example, the loss function includes a cross entropy loss function, such as a binary cross entropy loss function.

At least one coefficient of the neural network is updated based on results of the evaluating (block 610). For example, the loss module 312 can provide training updates to the neural network module 306, which can then update one or more convolutional coefficients of a neural network by adding or subtracting the training updates from the coefficients.

The procedures described herein constitute improvements over conventional procedures that rely on histograms of colors for determining video cuts in video clips. Rather, the procedures described herein train a neural network to determine feature vectors for a sequence of digital video frames, and a probability of a video cut between two adjacent digital video frames having a boundary between the two adjacent digital video frames that is centered in the sequence of digital video frames. Hence, the procedures described herein can determine video cuts in video clips that have various types of video content, such as fast camera motion, subtitles and overlaid text, on-screen graphics, and the like, which typically result in failures by conventional procedures, such as false video cut detection or missed video cuts. Moreover, the procedures described herein can be fully automated and do not require manual tuning of thresholds, like conventional procedures that rely on histograms of colors for determining video cuts in video clips.

Furthermore, the procedures described herein constitute improvements over conventional procedures that are limited to detecting hard video cuts and fail for multi-frame video cuts. Rather, the procedures described herein can determine multi-frame video cuts that span multiple digital video frames, such as fades and wipes. Moreover, the procedures described herein determine the exact location of a video cut in a video clip, and are not limited to merely identifying a time window in which a video cut may exist, like many conventional procedures. Hence, the procedures described herein can be used in many video editing workflows in which conventional procedures are not suitable.

Example Systems and Devices

Figure 7:
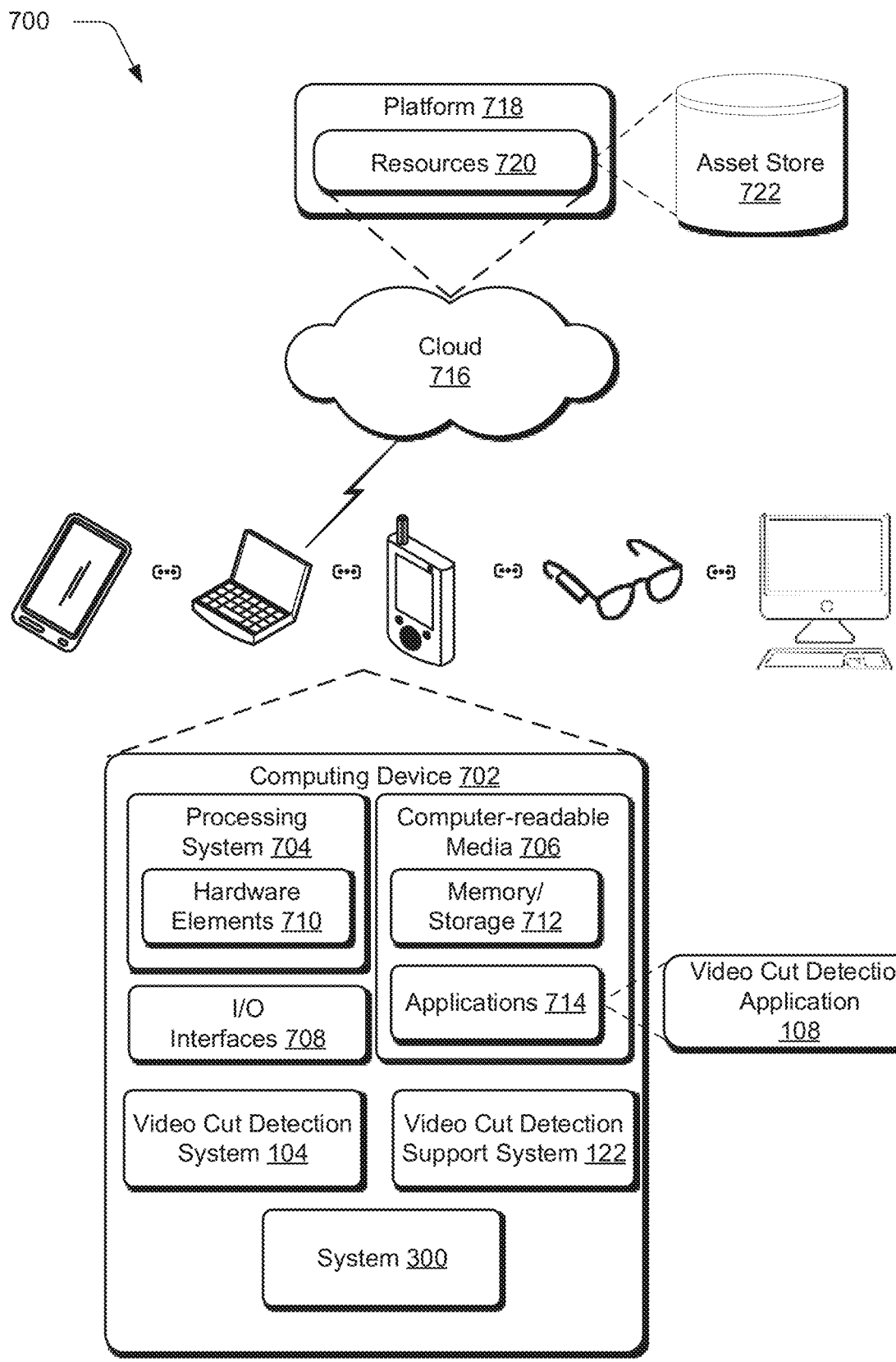
FIG. 7 illustrates an example system including various components of an example device that can be implemented as any type of computing device as described and/or utilized with reference to FIGS. 1-6 to implement aspects of the techniques described herein.

FIG. 7 illustrates an example system 700 including an example computing device 702 that is representative of one or more computing systems and devices that can be utilized to implement the various techniques described herein. This is illustrated through inclusion of the video cut detection system 104, the system 300, the video cut detection application 108, and the video cut detection support system 122, which operate as described above. The computing device 702 can be, for example, a user computing device (e.g., the computing device 102), or a server device of a service provider, (e.g., the server 118). Furthermore, the computing device 702 can include an on-chip system, multiple computing devices, combinations thereof, or any other suitable computing device or computing system. Accordingly, FIG. 7 illustrates the computing device 702 as one or more of a tablet, a laptop computer, a smart phone, smart eye glasses, and a desktop computer, though these examples are illustrative and in no way are meant to limit the type or number of devices that can be represented by the computing device 702.

The example computing device 702 includes a processing system 704, one or more computer-readable media 706, and one or more I/O interfaces 708 that are communicatively coupled to each other. Although not shown, the computing device 702 can further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that can be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors can be comprised of semiconductor(s) and transistors (e.g., electronic integrated circuits (ICs)). In such a context, processor-executable instructions may be electronically-executable instructions. The processors 112 in FIG. 1 are an example of the processing system 704.

The computer-readable storage media 706 is illustrated as including memory/storage 712. The computer-readable storage media 106 in FIG. 1 is an example of memory/storage of the memory/storage 712. The memory/storage 712 can include volatile media (such as random access memory (RAM)), nonvolatile media (such as read only memory (ROM), flash memory, optical disks, magnetic disks, and so forth), or combinations thereof. The memory/storage 712 can include fixed media (e.g., RAM, ROM, a fixed hard drive, and so on) as well as removable media (e.g., flash memory, a removable hard drive, an optical disc, and so forth). The computer-readable media 706 can be configured in a variety of other ways as further described below.

The input/output interfaces 708 are representative of functionality to allow a user to enter commands and information to the computing device 702, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Accordingly, the input/output interfaces 708 can include a touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Thus, the computing device 702 can be configured in a variety of ways as further described below to support user interaction.

The computing device 702 also includes applications 714, which are representative of any suitable applications capable of running on the computing device 702, and can include a web browser which is operable to access various kinds of web-based resources (e.g., images, videos, digital video frames, assets, media clips, content, configuration files, services, user profiles, and the like). The applications 714 include the video cut detection application 108, which operates as previously described. Furthermore, the applications 714 can include any applications supporting the video cut detection system 104, the system 300, and the video cut detection support system 122.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 710 and the computer-readable media 706 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more of the hardware elements 710, or combinations thereof. The computing device 702 can be configured to implement particular instructions and functions corresponding to the software and hardware modules. Accordingly, implementation of a module that is executable by the computing device 702 as software may be achieved at least partially in hardware, e.g., through use of computer-readable storage media and the hardware elements 710 of the processing system 704. The instructions and functions may be executable/operable by one or more articles of manufacture (for example, one or more computing devices such as computing device 702 or processing systems such as the processing system 704) to implement techniques, modules, and examples described herein.

The techniques described herein can be supported by various configurations of the computing device 702 and are not limited to the specific examples of the techniques described herein. This functionality may also be implemented all or in part through use of a distributed system, such as over a "cloud" 716 via a platform 718. The cloud 716 includes and is representative of the platform 718 for resources 720. The platform 718 abstracts underlying functionality of hardware (e.g., servers) and software resources of the cloud 716. The resources 720 can include applications, data, or applications and data that can be utilized while computer processing is executed on servers that are remote from the computing device 702. The resources 720 can also include services provided over the Internet, through a subscriber network, such as a cellular or Wi-Fi network, or combinations thereof. The resources 720 can include asset store 722, which stores assets, such as video clips, digital video frames, training sequences, cut labels, probability thresholds, photographs, design files, documents, user profile data, user image libraries, animation sequences, digital images, metadata of assets, and the like, and can be accessed by the computing device 702.

Generally, the resources 720 may be licensed, purchased, or may be made freely available, (e.g., without authentication, license, or account-based access). The resources 720 can include any suitable combination of services and content, such as a video-editing service, an on-line shopping service, an image editing service, an artwork drawing service, a web development and management service, a collaboration service, a social networking service, a messaging service, an advertisement service, a graphics design service, an animation service, an image storage service (including storage of photos, digital images, video clips, documents, records, files, and the like), a graphics editing service, an asset distribution service, and so forth. Content may include various combinations of assets as described above, including document designs and review documents.

The platform 718 can abstract resources and functions to connect the computing device 702 with other computing devices. The platform 718 can also serve to abstract scaling of resources to provide a corresponding level of scale to encountered demand for the resources 720 that are implemented via the platform 718. Accordingly, in an interconnected device embodiment, implementation of functionality described herein may be distributed throughout the system 700. For example, the functionality can be implemented in part on the computing device 702 as well as via the platform 718 that abstracts the functionality of the cloud 716.

CONCLUSION

In one or more implementations, a digital medium environment includes at least one computing device. Systems, devices, and techniques are described herein for determining video cuts in video clips. A video cut detection system is implemented to receive a video clip that includes a sequence of digital video frames that depict one or more scenes. The video cut detection system can determine scene characteristics for the digital video frames, such as by generating feature vectors with a neural network for the digital video frames, the feature vectors representing features of the one or more scenes depicted in the digital video frames. The video cut detection system can determine, from the scene characteristics, a probability of a video cut between two adjacent digital video frames having a boundary between the two adjacent digital video frames that is centered in the sequence of digital video frames. The video cut detection system can then compare the probability of the video cut to a cut threshold to determine whether the video cut exists between the two adjacent digital video frames. To process the entire video clip, the video cut detection system can move a sliding time window across a timeline of the video clip to determine different sequences of digital video frames that are contained in the sliding time window, and for each sequence of digital video frames within the sliding time window, the video cut detection system can determine scene characteristics and a cut probability of a video cut. The video cut detection system can then mark the timeline of the video clip to indicate boundaries between digital video frames where a video cut exists.

The video cut detection system can generate training sequences of digital video frames to train the neural network that generates the feature vectors and the cut probability of a video cut. The video cut detection system can generate training sequences that do not include a video cut and label these training sequences with a false cut label. The video cut detection system can also generate training sequences labeled with a true cut label that have a video cut centered in the training sequence. The video cut detection system can also generate training sequences labeled with the false cut label that have the video cut that is off-center in the training sequences. Using the training sequences, the video cut detection system can evaluate a loss function based on the probability of the video cut and at least one of the false cut label or the true cut label, and update at least one coefficient of the neural network based on results of evaluating the loss function.

Although implementations of determining video cuts in video clips have been described in language specific to features and/or methods, the appended claims are not necessarily limited to the specific features or methods described. Rather, the specific features and methods are disclosed as example implementations of determining video cuts in video clips, and other equivalent features and methods are intended to be within the scope of the appended claims. Further, various different examples are described and it is to be appreciated that each described example can be implemented independently or in connection with one or more other described examples.

What is claimed is:

1. In a digital medium environment for determining video cuts in video clips, a method implemented by a computing device, the method comprising:
receiving a video clip of digital video frames that depict one or more scenes;
determining scene characteristics in a first sequence of the digital video frames encompassed by a sliding time window moving across the video clip, the scene characteristics stored as data in memory of the computing device;

determining, from the scene characteristics, a probability of a video cut between two adjacent digital video frames having a boundary between the two adjacent digital video frames in the first sequence;

moving the sliding time window to encompass a second sequence of the digital video frames, the second sequence including one or more of the digital video frames in the first sequence and additional digital video frames not included in the first sequence;

retrieving the scene characteristics from the memory that correspond to the one or more digital video frames included in both the first sequence and the second sequence;

determining additional scene characteristics in the second sequence of the digital video frames for the additional digital video frames not included in the first sequence; and determining, from the scene characteristics and the additional scene characteristics, the probability of the video cut between the two adjacent digital video frames having the boundary between the two adjacent digital video frames in the second sequence.

2. The method as described in claim 1, further comprising moving the sliding time window across a timeline of the video clip to encompass the first sequence of the digital video frames and the second sequence of the digital video frames as contained in the sliding time window.

3. The method as described in claim 2, further comprising repeating:
the moving the sliding time window across the timeline of the video clip to encompass subsequent sequences of the digital video frames of the video clip; and
the determining the probability of the video cut between the two adjacent digital video frames having the boundary between the two adjacent digital video frames in the subsequent sequences of the digital video frames.

4. The method as described in claim 3, wherein the subsequent sequences of the digital video frames of the video clip include one or more of the digital video frames also included in at least another one of the sequences of the digital video frames.

5. The method as described in claim 3, further comprising continuing the repeating until all of the digital video frames of the video clip are included in at least one subsequent sequence of the digital video frames of the video clip.

6. The method as described in claim 1, further comprising:
comparing the probability of the video cut to a cut threshold to determine whether the video cut exists between the two adjacent digital video frames; and
marking a timeline of the video clip to indicate the video cut exists between the two adjacent digital video frames when the probability of the video cut is greater than the cut threshold.

7. The method as described in claim 1, further comprising marking a timeline of the video clip to indicate the video cut does not exist between the two adjacent digital video frames when the probability of the video cut is not greater than a cut threshold.

8. The method as described in claim 1, further comprising:
generating feature vectors representing the scene characteristics in the first sequence of the digital video frames, the feature vectors representing features of the one or more scenes depicted in the digital video frames; and
generating additional feature vectors representing additional scene characteristics in the second sequence of the digital video frames, the additional feature vectors representing the features of the one or more scenes depicted in the digital video frames.

9. The method as described in claim 8, further comprising using a neural network for the generating the feature vectors and the additional feature vectors representing the scene characteristics and the additional scene characteristics in the digital video frames.

10. The method as described in claim 9, wherein the neural network is trained with:
at least one sequence of the digital video frames without the video cut between them, the at least one sequence of the digital video frames labeled with a false cut label;
an additional sequence of the digital video frames with the video cut centered in the additional sequence between the two adjacent digital video frames, the additional sequence of the digital video frames labeled with a true cut label; and
another sequence of the digital video frames with an off-center video cut, the another sequence of the digital video frames labeled with the false cut label.

11. The method as described in claim 10, wherein the at least one sequence of the digital video frames without the video cut between them includes a digital video frame that is repeated in the at least one sequence of the digital video frames.

12. The method as described in claim 1, further comprising:
determining, from the scene characteristics corresponding to three or more of the digital video frames, a multi-frame probability of a multi-frame video cut that spans across the three or more digital video frames; and
comparing the multi-frame probability of the multi-frame video cut to a multi-frame cut threshold to determine whether the multi-frame video cut exists across the three or more digital video frames.

13. A video cut detection system implemented by a computing device for determining video cuts in video clips in a digital medium environment, the video cut detection system comprising:
a memory to maintain a video clip that includes digital video frames that depict one or more scenes; and
a processor system to implement a video cut detection application at least partially in hardware of the computing device to:
determine scene characteristics in a first sequence of the digital video frames encompassed by a sliding time window moving across the video clip, the scene characteristics stored as data in the memory;
determine, from the scene characteristics, a probability of a video cut between two adjacent digital video frames having a boundary between the two adjacent digital video frames in the first sequence of the digital video frames;
move the sliding time window to encompass a second sequence of the digital video frames, the second sequence including one or more of the digital video frames in the first sequence and additional digital video frames not included in the first sequence;
retrieve the scene characteristics from the memory that correspond to the one or more digital video frames included in both the first sequence and the second sequence;
determine additional scene characteristics in the second sequence of the digital video frames for the additional digital video frames not included in the first sequence; and determine, from the scene characteristics and the additional scene characteristics, the probability of the video cut between the two adjacent digital video frames having the boundary between the two adjacent digital video frames in the second sequence.

14. The video cut detection system as described in claim 13, where the video cut detection application is implemented to:
   move the sliding time window across the video clip to initially encompass the first sequence of the digital video frames, and then encompass the second sequence of the digital video frames;
   move the sliding time window on a timeline of the video clip to encompass subsequent sequences of the digital video frames of the video clip; and
   repeat to determine the scene characteristics, to determine the probability, and the compare to determine whether the video cut exists between the two adjacent digital video frames.

15. The video cut detection system as described in claim 14, wherein the video cut detection application is implemented to move the sliding time window on the timeline of the video clip by an amount of time corresponding to multiple digital video frames of the digital video frames of the video clip, and wherein the subsequent sequences of the digital video frames of the video clip include one or more of the digital video frames also included in at least another one of the sequences of the digital video frames.

16. The video cut detection system as described in claim 14, wherein the video cut detection application is implemented to continue the repeat to determine the scene characteristics, to determine the probability, and the compare to determine whether the video cut exists until all of the digital video frames of the video clip are included in at least one of the subsequent sequences of the digital video frames of the video clip.

17. In a digital medium environment for determining video cuts in video clips, a method implemented by a computing device, the method comprising:
   moving a sliding time window across a timeline of a video clip to select a sequence of digital video frames of the video clip that are encompassed by the sliding time window;
   generating feature vectors for the digital video frames that represent features of one or more scenes depicted in the sequence of the digital video frames;
   moving the sliding time window to encompass a subsequent sequence of the digital video frames, the subsequent sequence including one or more of the digital video frames in the sequence and additional digital video frames not included in the sequence;
   generating additional feature vectors for additional digital video frames that represent the features of the one or more scenes depicted in the subsequent sequence of the additional digital video frames; and
   determining, from the feature vectors and the additional feature vectors, a multi-frame probability of a multi-frame video cut that spans across multiple adjacent digital video frames; and
   comparing the multi-frame probability of the multi-frame video cut to a multi-frame cut threshold to determine whether the multi-frame video cut exists across the multiple adjacent digital video frames.

18. The method as described in claim 17, further comprising:
   storing the feature vectors generated for the sequence of the digital video frames and the additional feature vectors generated for the subsequent sequence of the additional digital video frames in a memory of the computing device; and
   comparing the multi-frame probability of the multi-frame video cut to a multi-frame cut threshold to determine whether the multi-frame video cut exists across the multiple adjacent digital video frames.

19. The method as described in claim 18, wherein the moving the sliding time window, the generating the feature vectors and the additional feature vectors, the determining the multi-frame probability of the multi-frame video cut, and the comparing are performed automatically and without user intervention.

20. The method as described in claim 17, wherein the generating the feature vectors for the digital video frames are generated with a neural network that is trained with:
   at least one sequence of the digital video frames without the multi-frame video cut between them, the at least one sequence of the digital video frames labeled with a false cut label;
   an additional sequence of the digital video frames with the multi-frame video cut centered in the additional sequence of the digital video frames, the additional sequence of the digital video frames labeled with a true cut label; and
   another sequence of the digital video frames with an off-center multi-frame video cut, the another sequence of the digital video frames labeled with the false cut label.

* * * * *